Aug. 18, 1959  G. H. BARTLETT  2,899,770
POCKET-TYPE LURE CONTAINER
Filed Nov. 20, 1956
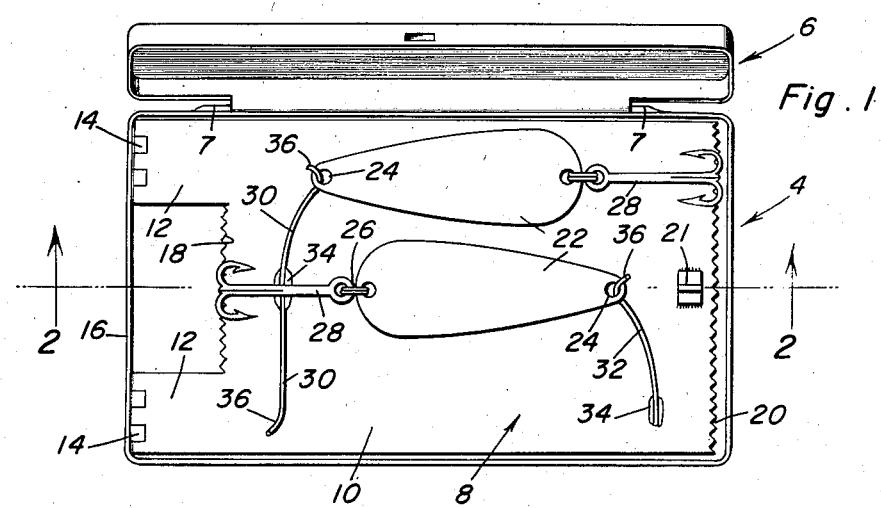
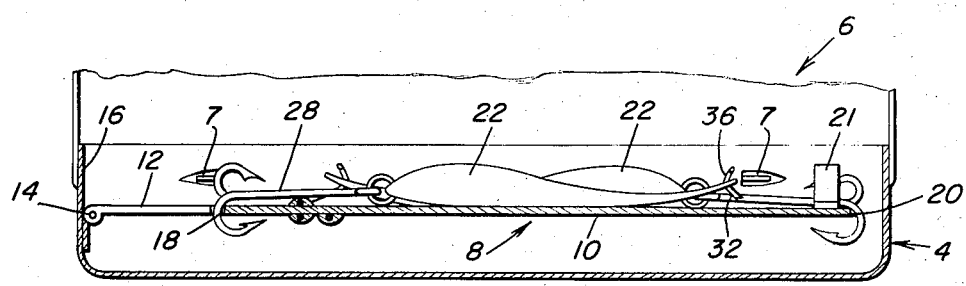
Fig. 2
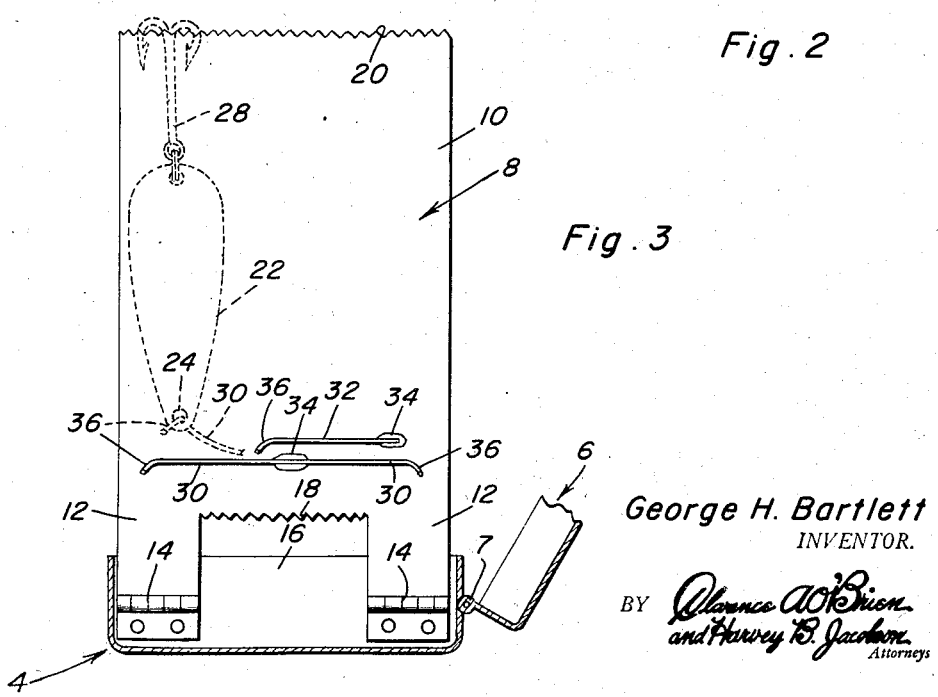
Fig. 3
George H. Bartlett
INVENTOR.
BY Clarence A. O'Brien
and Harvey B. Jacobson
Attorneys United States Patent Office 2,899,770
Patented Aug. 18, 1959

2,899,770
POCKET-TYPE LURE CONTAINER
George H. Bartlett, Billings, Mont.
Application November 20, 1956, Serial No. 623,380
1 Claim. (Cl. 43—57.5)

The present invention relates to a holder and carrier for artificial bait and has reference in particular to a pocket-size box-type container having practical and accessible means therein for detachably supporting a plurality of lures, spoons for example, a construction which lends itself to convenient and satisfactory use by stream fishermen.

Fishing tackle and bait boxes are not new and are therefore of many and varied styles and forms. An object of the instant invention is to provide a durable, lightweight, simple and economical bait box which lends itself to the purposes for which it is intended for use and therefore offers facilities in a box construction which promote not only convenience of use in handling but make possible the systematic maintenance of lures in the stated box.

Systematic support and confined retention of artificial bait in a protective box is not new as is shown, for example, in the Archer patent, 2,665,517 of January 12, 1954. Support cards and tubes are also known to be old in accommodatingly supporting groups of hook-equipped snells. The instant invention is such in construction that it lends itself, structurally and functionally, to practical use in accessibly storing hook-equipped spoons and so-called wobblers.

Other objects, features and advantages will become more readily apparent from the following description and the accompanying drawing.

In the drawing:
Fig. 1 is a top plan view of the improved pocket-type lure container with the lid or cover open;
Fig. 2 is a sectional view, with parts appearing in elevation, taken on the line 2—2 of Fig. 1; and
Fig. 3 is a modification showing a cross-section with the box open and also the panel-like plate or holder swung out to an accessible bait applying and removing position.

Briefly the invention comprises a container, a holder hingedly mounted and normally confined in the storage of compartment space of the container but which is adapted to be grasped by the user's hand and swung outwardly from the container space to render the lure attaching and supporting surfaces of the holder conveniently accessible and so available that the lures may be attached to or removed from said holder.

In the drawings the container is shown as a substantially rectangular pocket-size box of suitable material. It comprises a receptacle portion 4 and a lid or cover section 6. The latter has a marginal rim which fits down over the walls of the receptacle portion and it is suitably and hingedly mounted on the receptacle portion at 7.

The obvious principal improvement is in the means which is accessibly and satisfactorily confined in the compartment or storage space of the box. This is referred to broadly as an artificial bait holder 8. More specifically, it comprises a simple metal or an equivalent panel-like plate or divider 10. This is such that it fits within the confines of the receptacle portion in the manner shown. One end, the left-hand end in the drawings, is bifurcated and provides a pair of co-planar furcations 12 which are hingedly bracketed at 14 to the transverse end wall 16 of the box. The bifurcated construction also provides a notch between the furcations and the edge 18 of the notch is spaced from the wall 16 and it is serrated to provide anchoring teeth in the manner shown. Also the free swingable transverse edge portion of the plate is similarly serrated to provide additional anchoring teeth 20. On what may be called the top side at the last-named end there is a suitably constructed and attached finger-grip 21 which may be caught hold of to swing the holding plate into the box or out of the box in an obvious manner. This construction lends itself to attaching lures on both sides of the plate. The lures are generally so-called wobblers or spoons. The spoon proper in each instance is denoted by the numeral 22 and has a hole 24 at one end and a similar hole at the opposite end but equipped with a connecting ring 26 which in turn is hingedly connected with the shank 28 of a multiple prong fishhook. The barbed portions of the hook are engaged selectively over either the toothed edge 18 or the toothed edge 20 as is shown for example in the drawings. A simple pocket-size box having the construction disclosed in the drawing serves to accommodate a half dozen more or less spoons or lures. In order to hold each lure in place a flexible holddown or anchoring finger is provided. The individual fingers are denoted by the numerals 30 and 32 respectively. As shown for instance in Fig. 1 the two fingers 30 are formed from a single length of wire which has a central portion welded or otherwise secured to the plate at 34. The free ends of the fingers are fashioned into laterally bent hooks or retainers 36 which conveniently pass through the apertures or eyes on the spoons in the manner shown. The individual fingers 32 may be provided at one end of the plate as shown in Fig. 3. In other words, double and single retaining fingers are affixed at suitably spaced points on the plate surfaces and on opposite sides of the plate.

Minor changes in shape, size, materials and rearrangement of parts may be resorted to in actual practice without departing from the spirit of the invention or the scope of the invention as claimed.

What is claimed as new is as follows:
A holder and carrier for a plurality of artificial lures, for example, spoons equipped with gang hooks, comprising a box having a receptacle portion generally rectangular in plan and a hinged portion providing a cover for said receptacle portion, a single panel-like substantially imperforate plate generally flat and rectangular in form and providing a holder on which the lures are adapted to be removably stored when they are not in use, said plate normally having and occupying a position opposed to the bottom of said receptacle portion and being of a size to fit with requisite nicety into the confines of the walls of the receptacle portion and having one transverse end bifurcated and providing a pair of furcations and a bight portion between the furcations, said bight portion constituting an edge and being serrated and providing teeth, the end portions of said furcations being provided with hinging knuckles and being hingedly attached to an interior surface of one end wall of said receptacle portion, the transverse edge of the plate opposite to the hingedly attached edge being free and also serrated to provide additional selectively usable hook teeth, and a plurality of fingers having free resilient end portions which serve to yieldingly hold the free apertured end portions of spoons in an intended flatwise position against the cooperating surface of said plate, said fingers being disposed in a plane generally parallel to the plane of said plate and having portions thereof rigidly attached to predetermined isolated areas of the opposite flat sides of the plate, whereby said fingers are separated and are out of the way of each other when they are being used.

References Cited in the file of this patent

UNITED STATES PATENTS

| | | |
|---|---|---|
| 1,489,471 | Tilton | Apr. 8, 1924 |
| 1,749,227 | Pruett | Mar. 4, 1930 |
| 2,125,856 | De Witt | Aug. 2, 1938 |
| 2,665,517 | Archer | Jan. 12, 1954 |

FOREIGN PATENTS

| | | |
|---|---|---|
| 93,442 | Sweden | Nov. 25, 1938 |